United States Patent [19]

Zweigle et al.

[11] 4,256,505

[45] Mar. 17, 1981

[54] HOT MELT COMPOSITIONS

[75] Inventors: Maurice L. Zweigle, Midland; Janet C. Hickman, Rhodes, both of Mich.

[73] Assignee: The Dow Chemical Company, Midland, Mich.

[21] Appl. No.: 28,775

[22] Filed: Apr. 10, 1979

Related U.S. Application Data

[63] Continuation-in-part of Ser. No. 926,488, Jul. 20, 1978, abandoned.

[51] Int. Cl.³ .......................... C08L 1/10; C08L 1/26
[52] U.S. Cl. .................................... 106/171; 106/179; 106/180; 106/185; 106/188; 106/182
[58] Field of Search ............... 106/171, 179, 180, 191, 106/185, 188, 182; 426/125; 427/207 A

[56] References Cited

U.S. PATENT DOCUMENTS

| | | | |
|---|---|---|---|
| 2,678,284 | 5/1954 | Holt, Jr. ........................... | 427/207 A |
| 2,951,763 | 9/1960 | Kelly et al. ......................... | 426/125 |
| 2,962,382 | 11/1960 | Ives . | |
| 3,053,695 | 9/1962 | Park et al. ........................ | 427/207 A |
| 3,149,040 | 9/1964 | Jeffries ................................. | 106/171 |

OTHER PUBLICATIONS

Chem. Abst. vol. 78:125,499m 1973.

*Primary Examiner*—Theodore Morris

[57] ABSTRACT

Hot melt compositions of a cellulosic such as ethyl cellulose, an oil extender and a compatibilizing amount of a surfactant such as polyoxyethylene sorbitan monolaurate exhibit (1) reduced oil exudation and/or (2) increased compatibility of the components in said composition.

28 Claims, No Drawings

HOT MELT COMPOSITIONS

CROSS-REFERENCE TO RELATED APPLICATION

This application is a continuation-in-part of our copending application Ser. No. 926,488, filed July 20, 1978 now abandoned.

BACKGROUND OF THE INVENTION

This invention relates to hot melt coating compositions, in particular, to stabilized compositions of a cellulosic and an oil extender.

Due to their physical properties such as coating capability, strength, thermal stability and ease of removal; hot melt compositions of ethyl cellulose and an oil extender are widely used as temporary protective coatings for various articles such as tools, machinery and the like.

In a typical operation, a coating formulator prepares the hot melt compositions by mixing an ethyl cellulose, an oil extender (generally a mineral oil) and other adjuncts, e.g., plasticizers and heat stabilizers, with constant agitation and heat until a solution occurs. The resulting solution is solidified by cooling to ambient temperatures, i.e., 20°-30° C. During this solidification, the mixture is formed into blocks or other convenient shapes for shipment and subsequent storage.

In the coating operation, the solid blocks of the hot melt composition are reheated to a molten form, with temperatures from 125° to 190° C. conventionally being employed. The part to be coated is dipped in the molten composition for a short period, e.g., 1-5 seconds, then withdrawn and excess material drained therefrom. The composition solidifies on the part upon cooling, forming the temporary protective coating.

Unfortunately, the oil extender in the composition often tends to exude excessively from the composition in its solidified form. Such oil exudation causes handling and packaging problems and creates a fire and safety hazard in storage facilities. Moreover, the exuded oil is not generally recoverable, thereby necessitating the replacement of the lost material. In addition, the compatibility of the hot melt components, i.e., ethyl cellulose, oil extender and other adjuncts, is often poor in the solidified composition, as evidenced by the crazing, swirling and the like therein.

Heretofore, oil exudation has been decreased by reducing the concentration of the oil in the hot melt composition. See, for example, U.S. Pat. Nos. 2,517,754 and 2,951,763. Unfortunately, such practice is economically undesirable.

In view of these stated deficiencies, it is highly desirable to furnish a hot melt coating composition containing a cellulosic and substantial amounts of an oil extender which composition exhibits reduced oil exudation and improved compatibility.

SUMMARY OF THE INVENTION

Accordingly, one aspect of the present invention is a hot melt composition comprising a cellulosic, an oil extender and a compatibilizing amount of a surfactant.

In a second aspect, the present invention is a method for compatibilizing a hot melt composition of a cellulosic and oil extender, said method comprising blending a compatibilizing amount of a surfactant with the hot melt composition.

For the purposes of this invention, a compatibilizing amount of surfactant is an amount of surfactant sufficient to (1) measurably reduce the oil exudation from a solidified composition of a cellulosic and oil extender and/or (2) visually improve the compatibility of the components in the solidified composition. As such, the novel hot melt compositions of this invention are unique in that they exhibit less oil exudation and/or improved compatibility than do hot melt compositions containing no surfactant. In addition, the other desirable properties of conventional hot melt compositions such as thermal and color stability and coating capability are not significantly affected.

The compositions of this invention are useful in coating applications, particularly, for temporary protective coatings for many articles such as machinery, tools and the like.

DETAILED DESCRIPTION OF PREFERRED EMBODIMENTS

For the purposes of this invention a hot melt composition comprises a mixture of an oil extender and a cellulosic which mixture (1) forms a liquid solution when heated to a temperature less than about 225° C., and (2) after forming said solution, upon cooling to ambient temperatures, e.g., 20°-30° C., solidifies to a monolithic type semi-solid or gel-like material. When this material is reheated to a temperature of at least about 90° C., it reforms to a liquid solution, i.e., melts. By the term "liquid solution" it is meant that the mixture of the cellulosic and oil extender appears as a uniformly dispersed or homogeneous liquid under visual inspection with no magnification. Generally, in such solution, individual molecules and/or colloidal size particles of the cellulosic are uniformly dispersed in the oil. When said mixture of the cellulosic and oil extender is a liquid solution, the hot melt composition is hereinafter referred to as a "molten composition." When said mixture is solidified, the hot melt composition is hereinafter referred to as a "solidified composition."

Cellulosics and oil extenders suitably employed in the practice of this invention include those cellulose or cellulose derivatives and oil extenders which in the presence of a compatibilizing amount of a surfactant (as hereinafter described) form a hot melt composition.

As used herein, the term "oil extender" refers to any normally liquid material which is not miscible with water and which is at least partially soluble in ethyl ether at ambient temperatures. Representative examples of oil extenders useful in the practice of this invention include mineral oils such as aliphatic or wax base, aromatic or asphalt based, and mixed base petroleum oils; petroleum derived oils such as paraffinic or lubricating oils; vegetable oils such as linseed, tung, soybean, cottonseed, castor, coconut and palm oils; animal oils such as fish and sperm oil; mixed glycerides and the like, or mixtures thereof. Of these oil extenders, the mineral oils and vegetable oils are preferred, with a mineral oil of the paraffinic variety or derived from a naphthenic petroleum source and mixtures thereof being especially preferred.

Representative examples of cellulosics useful herein include ethyl cellulose, cellulose acetate butyrate, cellulose nitrate, cellulose acetate propionate, cellulose acetate, ethyl hydroxyethyl cellulose and the like. Preferred cellulosics include ethyl cellulose and cellulose acetate butyrate. Most preferred is ethyl cellulose having an ethoxy content in the range from about 45 to about 51 percent, preferably from about 49 to about 49.5 percent, by weight, and a viscosity of less than about 150 cps, preferably from about 40 to about 100 cps. Said viscosity is the viscosity of a 5 weight percent solution of the ethyl cellulose in an 80/20 by volume toluene/ethanol mixture as measured by a Ubbelhode viscometer (1.1 mm inside diameter) at 25° C.

Advantageously, the hot melt compositions of this invention comprise from about 15 to about 50 weight percent, preferably from about 20 to about 40 weight percent of the cellulosic, and from about 85 to about 50 weight percent, preferably from about 80 to about 60 weight percent of the oil extender, wherein the weight percent is based on the total weight of the cellulosic and oil extender.

Optionally, the hot melt compositions of this invention may also contain other adjuncts, such as plasticizers, stabilizers and the like. The adjuncts employed and their amounts are dependent on the end use application of the hot melt composition. Such adjuncts are readily determined by persons skilled in the art and are not critical to the application of this invention.

For the purposes of this invention, the term "surfactant" is intended to mean any surface active agent which reduces surface tension when dissolved in water or an aqueous solution or which reduces interfacial tension between two liquids or between a liquid and a solid. Included within said term are those compounds conventionally called detergents, wetting agents and emulsifiers. Illustrative examples of such surfactants are those presented in *McCutcheon's Detergents and Emulsifiers* edited by J. W. McCutcheon, published in 1976 by John W. McCutcheon, Inc., Morristown, N.J.

Surfactants suitably employed in the practice of this invention are those surface active agents which when employed in a compatibilizing amount (1) measurably reduce the oil exudation from a solidified composition, and/or (2) visually increase the compatibility of the components in said composition. Advantageously, such compatibilizing amount of surfactant does not deleteriously effect the other properties of said solidified composition, i.e., does not significantly reduce thermal stability or strength properties of coatings made therefrom. By "measurably reduce the oil exudation" it is meant that the oil exudation is reduced by a measurable amount using conventional test methods, e.g., NOTE 2 of Table I in Example 1. Preferably, such compatibilizing amount of surfactant reduces oil exudation by at least 20 weight percent, more preferably by at least about 50 weight percent, when compared with an identical solidified composition containing no surfactant. By way of example, a solidified composition exhibiting an initial oil exudation of 3 weight percent exhibits at least 20 weight percent less oil exudation when the oil exudation after addition of surfactant is less than or equal to 2.4 weight percent, said weight percents being based on the weight of the total mixture.

In general, incompatibility of the components in the solidified composition is evidenced by the formation of two phases; typically, an oil rich phase and cellulose rich phase. In a normal operation, the cellulose rich phase appears as crazing, swirling, void formation and the like within the solidified composition. By "visually increase the compatibility of the components in the solidified composition," it is meant that such separation, in a block of the solidified composition having dimensions of at least 5 cm on a side, is visibly reduced throughout the block as evidenced by reduced crazing, swirling and void formation.

Advantageously, the surfactants employed in this invention are weak (i.e., only partially ionizable) anionic or cationic, nonionic and amphoteric surfactants having an HLB value of at least about 6 (wherein HLB is hydrophilic-lipophilic balance of the surfactant) and which are soluble in the mixture of the cellulosic and oil extender. By the term "soluble" it is meant that the surfactant forms a liquid solution, i.e., appears as a uniformly dispersed or homogeneous liquid under visual inspection with no magnification, with said mixture at some temperature less than about 225° C. Representative examples of such soluble nonionic surfactants useful in the practice of this invention include the polyoxyethylene derivatives of fatty acid partial esters of sorbitol anhydrides, e.g., poly(oxyethylene)$_{20}$ sorbitan monolaurate and poly(oxyethylene)$_4$ sorbitan monostearate; the ethoxylated sorbitan esters, e.g., sorbitan monooleate; alkylphenoxypoly(oxyethylene)ethanols, e.g., nonylphenoxypoly(ethyleneoxy)ethanol; and the polyoxyalkylene derivatives of propylene glycol. Representative of such amphoteric surfactants is the sodium salt derivative of dicarboxylic caprylic acid sold as Miranol® J2M by the Miranol Chemical Co., Inc. Weak anionic surfactants useful herein include the metal salt of a long chain (i.e., six or more carbon atoms) carboxylic acid, advantageously, the alkali metal salt of such carboxylic acid, i.e.,

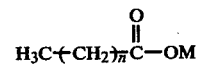

wherein n is preferably an integer of at least 6, more preferably n is an integer of at least about 8 and less than about 200, and M is an alkali metal salt, preferably sodium, such as the sodium salt of stearic acid (i.e., sodium stearate). A representative example of a weak cationic surfactant is polypropoxylated quaternary ammonium chloride. Preferred surfactants are nonionic and weak anionic surfactants; with polyoxyethylene (20) sorbitan monolaurate; polyoxyethylene (20) sorbitan monostearate; nonylphenoxypoly(ethyleneoxy)ethanol; the polyoxyalkylene derivatives of propylene glycol and the alkali metal salt of long chain carboxylic acids, particularly sodium stearate, being especially preferred.

Amounts of such surfactants required to give the compatibilizing effect hereinbefore defined will vary depending on the surfactant employed and the type and relative concentration of the cellulosic and oil extender. Typically, the surfactant is employed at a concentration of at least 0.1 weight percent. Advantageously, it is employed at a concentration from about 0.2 to about 35 weight percent, preferably from about 0.2 to about 15 weight percent, more preferably from about 0.5 to about 5 weight percent, most preferably from about 0.5 to about 2 weight percent based on the total weight of the cellulosic and oil extender. Generally, to reduce the possibility of excessive degradation of the hot melt adhesive, the weak cationic and anionic surfactants are more advantageously employed at the lower percentages, i.e., from about 0.1 to about 5, preferably from about 0.2 to about 4, weight percent based on the weight of the cellulosic and oil extender.

In preparing the compositions of this invention, a compatibilizing amount of the surfactant is blended in the hot melt composition. By the term "blended" it is meant that the surfactant becomes solubilized in the cellulosic and oil extender mixture. In a normal operation, the hot melt composition is prepared by conventional techniques, with the surfactant being blended with the molten composition. For example, the oil extender, cellulosic, surfactant and other adjuncts may be admixed and heated with agitation to a temperature at which solution occurs, e.g., 100°–225° C. Alternatively, a solidified hot melt composition condition may be reheated to a molten composition and a compatibilizing amount of surfactant subsequently added thereto. Advantageously, the oil extender and other adjuncts are heated, with agitation, to such molten temperatures and a cellulosic/surfactant mixture added thereto in a batchwise, intermittent or continuous manner, with continuous or intermittent addition being preferred. In such case, the cellulosic is advantageously treated in such manner that the surfactant is physically attached thereto. Typically, such treatment consists of spraying a solution of the surfactant on a water-wet cellulosic and subsequently drying the surfactant to the cellulosic.

Beneficially, the agitation provided to said mixtures is of a type and amount which minimizes the introduction of air into the liquefied mixture while providing rapid solution formation.

The resulting molten hot melt composition may be used as prepared or solidified by cooling. In the latter case, the solidified hot melt compositions are normally heated to a molten composition prior to use in coating applications.

The following examples are set forth to illustrate the advantages of the hot melt compositions of this invention and should not be construed to limit its scope. In the examples, all parts and percentages are by weight unless otherwise indicated.

EXAMPLE 1

To a 10 l. melting pot equipped with a thermocouple, heating and cooling device, agitator and thermometer is added the following ingredients:

| Ingredient | Parts |
|---|---|
| White Mineral Oil | 1,855 |
| Castor Oil | 183 |
| Epoxidized Soybean Oil | 61 |
| Styrene Based Plasticizer[1] | 176 |
| Triaryl Phosphite Heat Stabilizer[2] | 15 |

[1] Sold as 276 V9 Dow Resin by The Dow Chemical Company
[2] Sold as Advastab CH-201 by Cincinnati Milacron Chems., Inc.

While mildly agitating these ingredients, the melting pot is heated to about 120° C. and maintained at that temperature for a period of about 5 minutes. At this time, a mixture comprised of 687 parts of ethyl cellulose having 49.3 percent ethoxy by weight and a viscosity, as a 5 weight percent solution in an 80/20 by volume toluene/ethanol mixture, of 50 cps as measured by a Ubbelhode viscometer (1.1 mm inside diameter) at 25° C. (sold as Ethocel ® by The Dow Chemical Company), 23 parts ditertiary butyl paracresol and 30 parts of a polyoxyethylene sorbitan monolaurate (sold as Tween ® 20 by ICI America) is continuously added to the melting pot for a 10 minute period. Following this addition, the temperature of the melting pot is increased to about 140° C. and maintained at that temperature for about 3 hours. The resulting solution is a hot melt composition and is designated Sample No. 1. A portion of this solution is tested for oil exudation. The results of this testing are presented in Table I.

Similar hot melt compositions (Sample Nos. 2–7) are prepared in a similar manner using various surfactants as identified in Table I. A hot melt composition (Sample No. C) is prepared in a similar manner except no surfactant is incorporated in the composition. Each of these samples are also tested for oil exudation, with the results being recorded in Table I.

TABLE I

| Sample No. | C* | 1 | 2 | 3 | 4 | 5*(4) | 6*(4) | 7* |
|---|---|---|---|---|---|---|---|---|
| Surfactant(1) | — | Tween 20 | Igepal CO-990 | Pluronic F68 | Pluronic F77 | Span 85 Tween 61 | Span 85 Tween 20 | SLS |
| Oil Exudation(2) % | 2.9 | 0.5 | 0.5 | 0.03 | 0.1 | 5.0 | 2.9 | Extreme Degradation |
| Compatibility(3) | Poor | Good | Excel- | Excel- | Excel- | Poor | Poor | |

TABLE I-continued

| Sample No. | C* | 1 | 2 | 3 | 4 | 5*(4) | 6*(4) | 7* |
|---|---|---|---|---|---|---|---|---|
| | | | lent | lent | lent | | | |

*Not example of this invention
(1)Tween 20 - polyoxyethylene sorbitan monolaurate sold by ICI America
Igepal CO-990 - nonylphenoxypoly(ethyleneoxy)ethanol sold by GAF Corporation
Pluronic F68 - a polyoxyalkylene derivative of propylene glycol sold by BASF Wyandotte
Pluronic F77 - a polyoxyalkylene derivative of propylene glycol sold by BASF Wyandotte
Span 85 - sorbitan trioleate sold by ICI America
Tween 61 - polyoxyethylene sorbitan monostearate sold by ICI America
SLS - sodium lauryl sulfate
(2)Oil exudation is tested by pouring a portion of the hot melt composition, as prepared, from the melting pot into a Pyrex measuring cup. The cup is placed in a hot air oven at 50° C. for 24 hours. Following this period, the cup is cooled to ambient temperatures, e.g., about 22° C. The cup, solidified hot melt composition and exuded oil is weighed to the nearest 0.1 g. The solidified composition is removed from the cup. This material is dried with absorbent toweling and weighed to the nearest 0.1 g. The measuring cup is washed free of oil using and 80/20 by volume toluene/alcohol solution. It is then dried and weighed to the nearest 0.1 g. Oil exudation as a percentage of the weight of the solidified composition is determined using the followng formula:

$$\frac{(T_W - C_w) - DC_w}{DC_w}$$

Wherein $T_w$ is the combined weight of the cup, solidified composition and exuded oil, $C_w$ is the weight of the measuring cup and $DC_w$ is the weight of the solidified composition. Extreme degradation indicates the surfactant causes extreme degradation in the hot melt composition as evidenced by viscosity reduction and color formulation.
(3)Compatibility is tested by pouring a portion of the hot melt composition, as prepared, from the melting pot into a suitable container such that upon solidification a block of the composition is formed having dimensions of about 24 cm by 8 cm by 8 cm. This container is placed in a hot air over at 50° C. for 24 hours. Following this period, the cup is cooled to ambient temperatures, e.g., about 22° C. The solidified composition is removed from the container and then cut with a knife to give 16 pieces having dimensions of 2 cm by 8 cm by 8 cm. Each piece is visually inspected with no magnification and rated. A composite rating, based on these individual ratings is determined. The ratings in Table I are such composite ratings, wherein "excellent" indicates essentially no incompatibility. "Good" indicates some minor crazing, swirling and voids and "poor" indicates poor incompatibility as evidenced by excessive crazing, swirling and the like.
(4) Thirty parts of each listed surfactant are added to the hot melt composition in these samples.

As evidenced by the data in the foregoing Table, the presence of a compatibilizing amount of surfactant greatly reduces oil exudation and the incompatibility of the components in the hot melt composition.

Alternatively, the presence of sodium lauryl sulfate causes extreme degradation of the hot melt composition. This is believed to be due to the highly anionic character of said surfactant. The presence of Span 85 in the hot melt composition does not reduce oil exudation or incompatbility. This is believed to be due to the relatively low HLB of said surfactant (HLB=1.8).

EXAMPLE 2

A hot melt composition is prepared which is similar in all respects to the hot melt composition of Example 1 except that 3 parts of sodium stearate per 100 parts of ethyl cellulose is employed as the surfactant and about 2 parts of a trialkyl phosphite heat stabilizer per 100 parts of ethyl cellulose is employed in addition to the triaryl heat stabilizer. This hot melt composition is found to exhibit about 0.3 percent oil exudation by the method described by Note 2 of Table 1. By the method of Note 3 in Table I, its compatibility is found to be excellent.

As evidenced by this example, weak anionic surfactants, when employed in a compatibilizing amount, are shown to reduce oil exudation and increase compatibility of the components in a hot melt composition.

EXAMPLE 3

A 2500 part portion of a hot melt composition in a solidified condition having the following ingredients:

| Ingredient | Parts |
|---|---|
| White Mineral Oil | 925 |
| AA Castor Oil | 782 |
| Epoxidized Soybean Oil | 18 |
| Wax | 10 |
| Triaryl Phosphite Heat Stabilizer[1] | 5 |
| Butylated Hydroxy Toluene | 5 |
| Cellulose Acetate Butyrate | 825 |

[1]Sold as Advastab CH-201 by Cincinnati Milacron Chems., Inc.

is mixed with a blend comprising 462.5 parts of white mineral oil, 335 parts of Castor Oil and 33 parts of Pluronic F38, a polyoxyalkylene derivative of propylene glycol sold by BASF Wyandotte. This mixture is placed in a melting pot similar to the melting pot used in Example 1. The melting pot is heated to about 180° C. and maintained at that temperature until the solidified composition is completely melted. At this time, the ingredients in the melting pot are mildly agitated for a 30 minute period, while maintaining the temperature at about 180° C. The resulting solution is a hot melt composition. On cooling, the solidified composition shows about 0.5 percent oil exudation by the test methods of Example 1; see Note 2 of Table I therein.

A similar hot melt composition is prepared in a like manner except no surfactant, i.e., Pluronic F38, is included in the composition. The hot melt composition shows 3 percent oil exudation and extensive incompatibility as evidenced by the large amount of crazing therein.

EXAMPLE 4

A hot melt composition having the following ingredients:

| Ingredient | Parts |
|---|---|
| White Mineral Oil | 607 |
| Castor Oil | 60 |
| Epoxidized Soybean Oil | 20 |
| Styrene Based Plasticizer | 58 |
| Triaryl Phosphite Heat Stabilizer | 5 |
| Ethyl Cellulose | 250 |
| Cellulose Acetate Butyrate | 250 |
| Pluronic ® F38[1] | 40 |
| Dioctyl Phthalate | 10 |
| Ditertiary Butyl Paracresol | 50 |

[1]A polyoxyalkylene derivative of propylene glycol sold by BASF Wyandotte.

is prepared.

This mixture is placed in a melting pot similar to the melting pot employed in Example 1 and heated with agitation to about 170° C. After about 25 minutes at this temperature, a homogeneous liquid solution results. On cooling, the solidified composition is generally compatible, exhibiting only minimal crazing or swirling.

A similar hot melt composition having no surfactant therein exhibits excessive incompatibility between the ethyl cellulose and cellulose acetate butyrate.

Upon testing for oil exudation, it is found that the hot melt composition containing the surfactant (Pluronic ® F38) exudes lesser amounts of the oil extender than the hot melt composition containing no surfactant.

What is claimed is:

1. A hot melt composition comprising a cellulosic wherein the cellulosic is a cellulose ether or cellulose ester, an oil extender and from about 0.2 to about 15 weight percent of a surfactant based on the weight of the cellulosic and oil extender, wherein the surfactant is employed in an amount sufficient to measurably reduce the oil exudation from a solidified composition of the cellulosic and oil extender or visually improve the compatibility of the components in the solidified composition.

2. A hot melt composition comprising a cellulosic wherein the cellulosic is a cellulose ether or cellulose ester, a mineral oil and an amount of a surfactant sufficient to measurably reduce the oil exudation from a solidified composition of the cellulosic and mineral oil or visually improve the compatibility of the components in the solidified composition, wherein the hot melt composition comprises from about 15 to about 50 weight percent of the cellulosic and from about 85 to about 50 weight percent of the mineral oil, said weight percents being based on the total weight of the cellulosic and mineral oil.

3. The hot melt composition of claim 1 wherein the cellulosic is ethyl cellulose, cellulose acetate butyrate, cellulose nitrate, cellulose acetate propionate, cellulose acetate or ethyl hydroxyethyl cellulose.

4. The hot melt composition of claim 2 wherein the surfactant is a surfactant having an HLB value of at least 6 which is soluble in a mixture of the cellulosic and oil extender.

5. The hot melt composition of claim 2 wherein the surfactant is a polyoxyethylene derivative of fatty acid partial esters of sorbitol anhydrides, an ethoxylated sorbitan ester, an alkylphenoxypoly(oxyethylene)ethanol, a polyoxyalkylene derivative of propylene glycol or a sorbitan carboxylate.

6. The hot melt composition of claim 2 wherein the surfactant is a metal salt of a carboxylic acid having 6 or more carbon atoms.

7. The hot melt composition of claim 6 wherein the metal salt of a carboxylic acid is an alkali metal salt of a carboxylic acid containing 6 or more carbon atoms.

8. The hot melt composition of claim 7 wherein the alkali metal salt of a carboxylic acid is a sodium salt of stearic acid.

9. The hot melt composition of claim 2 comprising from about 0.2 to about 35 weight percent of the surfactant based on the weight of the cellulosic and oil extender.

10. The hot melt composition of claim 4 comprising from about 0.5 to about 5 weight percent of the surfactant based on the weight of the cellulosic and oil extender.

11. The hot melt composition of claim 10 wherein the cellulosic is ethyl cellulose.

12. The hot melt composition of claim 11 wherein the surfactant is a polyoxyalkylene derivative of propylene glycol.

13. The hot melt composition of claim 11 wherein the surfactant is an alkali metal salt of a carboxylic acid having 6 or more carbon atoms.

14. A method of stabilizing a hot melt composition of a cellulosic wherein the cellulosic is a cellulose ether or cellulose ester and an oil extender, said method comprising the step of blending from about 0.2 to about 15 weight percent of a surfactant based on the weight of the cellulosic and oil extender with the hot melt composition, wherein the surfactant is employed in an amount sufficient to measurably reduce the oil exudation from a solidified composition of the cellulosic and oil extender or visually improve the compatability of the components in the solidified composition.

15. The hot melt composition of claim 1 wherein the cellulosic is cellulose acetate butyrate.

16. The hot melt composition of claim 2 which further comprises a vegetable oil, animal oil, mixed glycerides or combinations thereof.

17. A hot melt composition comprising from about 15 to about 50 weight percent of a cellulosic wherein the cellulosic is a cellulose ether or a cellulose ester, from about 85 to about 50 weight percent of an oil extender, said weight percents being based on the total weight of the cellulosic and oil extender, and an amount of a surfactant sufficient to measurably reduce the oil exudation from a solidified composition of the cellulosic and oil extender or visually improve the compatability of the components in the solidified composition.

18. The hot melt composition of claim 17 wherein the oil extender is a mineral oil, vegetable oil, animal oil or a mixed glyceride.

19. The hot melt composition of claim 17 wherein the surfactant is a nonionic or amphoteric surfactant having an HLB value of at least 6 which is soluble in a mixture of the cellulosic and oil extender.

20. The hot melt composition of claim 17 wherein the surfactant is a polyoxyethylene derivative of fatty acid partial esters of sorbitol anhydrides, an ethoxylated sorbitan ester, an alkylphenoxypoly(oxyethylene)ethanol, a polyoxyalkylene derivative of propylene glycol, a sorbitan carboxylate or a sodium salt derivative of dicarboxylic caprylic acid.

21. The hot melt composition of claim 17 comprising from about 0.5 to about 15 weight percent of the surfactant based on the weight of the cellulosic and oil extender.

22. The hot melt composition of claim 17 comprising from about 0.5 to about 5 weight percent of the surfactant based on the weight of the cellulosic and oil extender.

23. The hot melt composition of claim 22 wherein the cellulosic is ethyl cellulose and the oil extender is a mineral oil, vegetable oil or their combination.

24. The hot melt composition of claim 23 wherein the surfactant is a polyoxyalkylene derivative of propylene glycol.

25. The hot melt composition of claim 23 which comprises from about 20 to about 40 weight percent cellulosic, from about 80 to about 60 weight percent oil extender and from about 0.5 to about 2 weight percent of surfactant wherein the weight percents are based on the total weight of the cellulosic and oil extender.

26. The hot melt composition of claim 22 wherein the cellulosic is cellulose acetate butyrate and the oil extender is a mineral oil, vegetable oil or their combination.

27. A method for stabilizing a hot melt composition comprising from about 15 to about 50 weight percent of a cellulosic wherein the cellulosic is a cellulose ether or cellulose ester and from about 85 to about 50 weight percent of an oil extender, said weight percents being based on the total weight of the cellulosic and oil extender, said method comprising the step of blending an amount of a surfactant with the hot melt composition, said amount being sufficient to measurably reduce the oil exudation from a solidified composition of the cellulosic oil extender or visually improve the compatibility of the components in the solidified composition.

28. The method of claim 27 wherein the surfactant is employed at from about 0.5 to about 15 weight percent based on the weight of the cellulosic and oil extender.

* * * * *

UNITED STATES PATENT AND TRADEMARK OFFICE
CERTIFICATE OF CORRECTION

PATENT NO. : 4,256,505
DATED : March 17, 1981
INVENTOR(S) : Maurice L. Zweigle, Janet C. Hickman It is certified that error appears in the above—identified patent and that said Letters Patent is hereby corrected as shown below:

Column 7, Table I, in the first asterisk footnote, delete "example" and insert --examples--; in footnote (2), line 4, delete "using and" and insert --using an--; in footnote (2), line 6, delte "followng" and insert --following--; in the formula, line 7, delete $T_W$ and insert --$T_w$--; in footnote (3), line 3, delete "over$^W$" and insert --oven--; line 34, delete "incompatbility" and insert --incompatibility--.

Column 9, line 37, delete "2" and insert --1--; line 41, delete "2" and insert --1--; line 47, delete "2" and insert --1--.

Column 10, line 4, delete "method of" and insert --method for--; line 13, delete "compatability" and insert --compatibility--; line 28, delete "compatibility" and insert--compatibility--.

Column 12, line 2, insert --and-- before "oil".

Signed and Sealed this

First Day of September 1981

[SEAL]

Attest:

GERALD J. MOSSINGHOFF

Attesting Officer

Commissioner of Patents and Trademarks